(12) United States Patent
Monk, IV et al.

(10) Patent No.: US 9,584,380 B2
(45) Date of Patent: *Feb. 28, 2017

(54) METHOD AND SYSTEM FOR DETECTING SLOW PAGE LOAD

(71) Applicant: eBay Inc., San Jose, CA (US)

(72) Inventors: J. Thomas Monk, IV, Mountain View, CA (US); Hemal Doshi, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,693

(22) Filed: Jun. 1, 2015

(65) Prior Publication Data

US 2015/0263912 A1 Sep. 17, 2015

Related U.S. Application Data

(63) Continuation of application No. 12/792,556, filed on Jun. 2, 2010, now Pat. No. 9,065,885.

(51) Int. Cl.
*G06F 15/173* (2006.01)
*H04L 12/26* (2006.01)
*H04L 29/06* (2006.01)
*H04L 1/16* (2006.01)
*H04L 29/08* (2006.01)

(52) U.S. Cl.
CPC ............ *H04L 43/04* (2013.01); *H04L 1/1607* (2013.01); *H04L 43/0852* (2013.01); *H04L 65/80* (2013.01); *H04L 67/02* (2013.01)

(58) Field of Classification Search
None
See application file for complete search history.

(56) References Cited

U.S. PATENT DOCUMENTS

| 6,362,836 B1 | 3/2002 | Shaw et al. |
| 6,992,983 B1 | 1/2006 | Chatterjee |
| 9,065,885 B2 | 6/2015 | Monk, IV et al. |
| 2003/0018447 A1 | 1/2003 | Florschuetz |
| 2003/0128711 A1 | 7/2003 | Olariu et al. |

(Continued)

OTHER PUBLICATIONS

"U.S. Appl. No. 12/792,556, Response filed Jan. 9, 2014 to Final Office Action mailed Oct. 10, 2013", 9 pgs.

(Continued)

*Primary Examiner* — Scott B Christensen
(74) *Attorney, Agent, or Firm* — Schwegman, Lundberg & Woessner, P.A.

(57) ABSTRACT

A method and system for detecting slow page load is provided. An example system comprises a page request detector, a session state information detector, a throughput calculator, a response builder, and a communications module. The page request detector may be configured to receive a request for a web page. The session state information detector may be configured to determine that the request does not include session state information. The throughput calculator may be configured to calculate a throughput value associated with the network connection between the client system and the server. The response builder may be configured to build an updated data packet by including, in the data packet, the throughput value and an instruction to store the throughput value on the client as session state information. The communications module may be configured to communicate the updated data packet to the client system.

20 Claims, 6 Drawing Sheets

(56) References Cited

U.S. PATENT DOCUMENTS

| | | |
|---|---|---|
| 2004/0107267 A1 | 6/2004 | Donker et al. |
| 2005/0036512 A1 | 2/2005 | Loukianov |
| 2006/0253454 A1 | 11/2006 | Coppola et al. |
| 2007/0038718 A1 | 2/2007 | Khoo et al. |
| 2008/0043684 A1 | 2/2008 | Hovey |
| 2011/0302234 A1 | 12/2011 | Monk, IV et al. |
| 2011/0302235 A1 | 12/2011 | Monk et al. |

OTHER PUBLICATIONS

"U.S. Appl. No. 12/792,556 , Response filed Jul. 15, 2013 to Non Final Office Action mailed Mar. 15, 2013", 11 pgs.

"U.S. Appl. No. 12/792,556, Final Office Action mailed Aug. 22, 2014", 15 pgs.

"U.S. Appl. No. 12/792,556, Final Office Action mailed Sep. 14, 2012", 14 pgs.

"U.S. Appl. No. 12/792,556, Final Office Action mailed Oct. 10, 2013", 13 pgs.

"U.S. Appl. No. 12/792,556, Non Final Office Action mailed Jan. 9, 2012", 15 pgs.

"U.S. Appl. No. 12/792,556, Non Final Office Action mailed Feb. 14, 2014", 14 pgs.

"U.S. Appl. No. 12/792,556, Non Final Office Action mailed Mar. 15, 2013", 12 pgs.

"U.S. Appl. No. 12/792,556, Notice of Allowance mailed Feb. 20, 2015", 8 pgs.

"U.S. Appl. No. 12/792,556, Response filed Jan. 14, 2013 to Final Office Action mailed Sep. 14, 2012", 10 pgs.

"U.S. Appl. No. 12/792,556, Response filed May 14, 2014 to Non Final Office Action mailed Feb. 14, 2014", 12 pgs.

"U.S. Appl. No. 12/792,556, Response filed Jul. 9, 2012 to Non Final Office Action mailed Jan. 9, 2012", 10 pgs.

"U.S. Appl. No. 12/792,556, Response filed Dec. 22, 2014 to Final Office Action mailed Aug. 22, 2014", 11 pgs.

"U.S. Appl. No. 12/792,560, Advisory Action mailed Feb. 22, 2013", 3 pgs.

"U.S. Appl. No. 12/792,560, Appeal Brief filed May 6, 2013", 12 pgs.

"U.S. Appl. No. 12/792,560, Examiner's Answer to Appeal Brief mailed Sep. 27, 2013", 6 pgs.

"U.S. Appl. No. 12/792,560, Final Office Action mailed Dec. 7, 2012", 10 pgs.

"U.S. Appl. No. 12/792,560, Non Final Office Action mailed Apr. 16, 2012", 9 pgs.

"U.S. Appl. No. 12/792,560, Reply Brief filed Nov. 27, 2013".

"U.S. Appl. No. 12/792,560, Response filed Feb. 7, 2013 to Final Office Action mailed Dec. 7, 2012", 10 pgs.

"U.S. Appl. No. 12/792,560, Response filed Aug. 16, 2012 to Non Final Office Action mailed Apr. 16, 2012", 9 pgs.

METHOD AND SYSTEM FOR DETECTING SLOW PAGE LOAD

RELATED APPLICATION

This application is a continuation of U.S. patent application Ser. No. 12/792,556, filed Jun. 2, 2010, the benefit of priority of which is claimed hereby, and which is incorporated herein by reference in its entirety.

TECHNICAL FIELD

This application relates to the technical fields of software and/or hardware technology and, in one example embodiment, to system and method to detect slow page load.

BACKGROUND

Web pages are electronic documents that can include textual, graphic, video, and audio content. Most Web pages are generated using the HyperText Mark-up Language (HTML), although the pages can include data encoded according to other formats, e.g., Moving Picture Experts Group (MPEG), Joint Photographic Experts Group (JPEG), Graphics Interchange Format (GIF), and so forth. The most common way to access a Web page is by using a Web browser. Typically, the pages are transferred from servers to recipient systems (the clients) using the HyperText Transfer Protocol (HTTP). HTTP is an application level protocol that is layered on top of the TCP/IP protocols.

In the Internet/intranet communications, the "effective" throughput of communication paths between servers and clients can vary greatly. The effective throughput depends on transmission rates, number of "hops," error rates, latencies, and so forth. Because servers and clients can be connected via a wide range of network technologies, the effective throughput can span several orders of magnitude. This means that a Web page that includes rich content designed for a high throughput path may not always be inappropriate for use by client systems that have slow connection to network servers over paths with much lower throughput.

Some existing systems permit the use of a specialized tag that allows an HTML-coded Web page to specify the use of two versions of a given image. The browser initially loads a low-resolution version of the image; then automatically loads a high resolution version to replace the low-resolution image.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
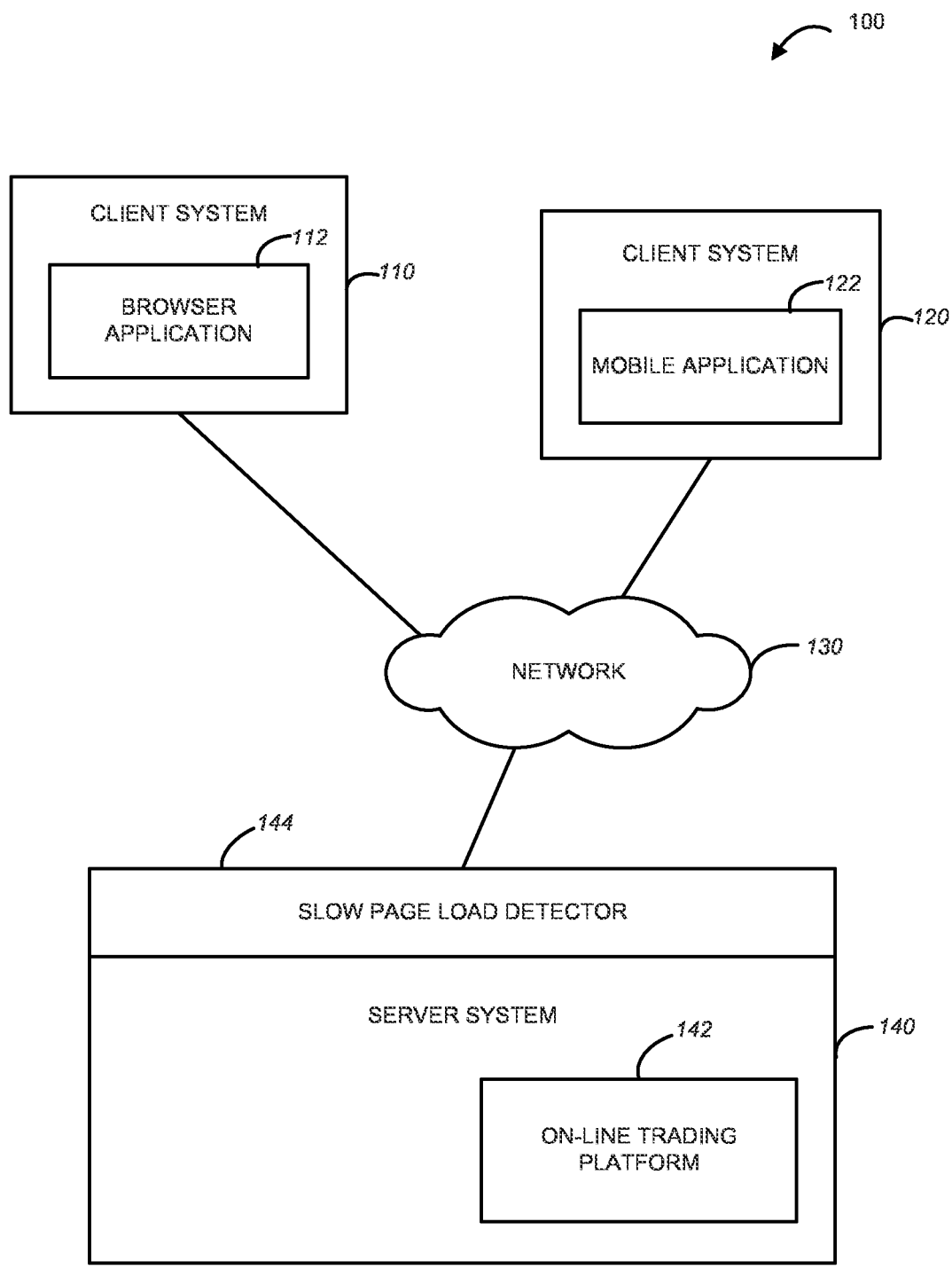
FIG. 1 is a diagrammatic representation of a network environment within which an example method and system for detecting slow page load may be implemented.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As data communicated between computer systems (e.g., web pages) are getting increasingly larger, there may still be users who access the Internet utilizing slower network connections and/or slower processing resources. Proposed is a method to identify those client systems that are characterized by slower page load and to serve them a simpler version of a web page that is not as large (e.g., that doesn't have as much client-side rich content, doesn't make as many client-side calls, etc.). Example methods and systems may be utilized beneficially to automatically detect slow connection speed or a scenario where a rich version of the requested data (e.g., a rich version of a web page) takes a long time to load, and serve the associated requesting client a lightweight version of the web page. It will be noted, that while some examples in this specification refer to a server system providing a requested web page to a browser application installed on a client, the techniques described herein may be applicable to scenarios where a client application is a mobile application, a desktop widget, etc. Also, the term "page" in the context of a slow page load may refer to a web page or any other response information that may be provided to browser application, a mobile application, a desktop widget, etc.

One example approach to detecting slow page load involves using server-side code at the transport layer (e.g., TCP driver) to perform a method for determining that a client system, which is receiving an HTTP response from a provider server over TCP/IP, has a slow network connection. A client system is a ubiquitous client, e.g., a desktop computer, a mobile device, a personal digital assistant (PDA), etc. TCP uses an end-to-end flow control protocol to avoid having the sender (e.g., a web server) send data too fast for the TCP receiver (e.g., a client browser) to reliably receive and process it. For example, if a personal computer (PC) sends data to a hand-held PDA that is slowly processing received data, the PDA must regulate data flow so as to not be overwhelmed. TCP uses a sliding window flow control protocol. In each TCP segment (also referred to as a TCP data packet), the receiving host specifies in the receiver window field the amount of additional data (in bytes) that it is able to buffer for the connection. The sending host can send only up to that amount of data before it must wait for an acknowledgment and window update from the receiving host (client). The inventive concept, in one example embodiment, involves using the receiver window size (RWIN) and the round trip time (RTT), as measured at the server, to determine the connection speed of a network connection connecting the client to the server. Once the connection speed is determined, the connection speed may be communicated to the client to enable the client to prompt the user to switch to a lightweight version of the requested page or pages. At the server, the connection speed (that may be expressed by a throughput value) may be encoded and included into an outgoing data packet by manipulating placeholder bytes present in the payload of the data packet. When the encoded throughput value is received at the client, the client-side code (e.g., Javascript), can cause the client to present the user with the option to switch to a lightweight version of the requested web page, or can cause the client to automatically request a lightweight version of the page.

Another example approach to detecting slow page load applies when a dedicated TCP/IP Offload Engine (TOE) (e.g. NetScaler) is deployed between the client system and the application server. Dedicated TOEs are responsible for buffering server responses. They retrieve the server response from the application server at fast LAN speeds and relay the data to the client at widely variable WAN/Internet speeds. As a result, dedicated TOEs can carefully monitor the rate at which they are able to empty their response buffer for each connection. This measurement accurately reflects the effective throughput of the communication path between the dedicated TOE and the client system. The dedicated TOE can then communicate this measured throughput value by encoding it and including it in specially formed outgoing data packets by manipulating placeholder bytes present in the data packet. When the encoded throughput value is received at the client, the client-side code (e.g. Javascript), can cause the client to present the user with the option to switch to a lightweight version of the requested web page, or can cause the client to automatically request a lightweight version of the page.

An example method and system for detecting slow page load may be implemented in the context of a network environment 100 illustrated in FIG. 1. As shown in FIG. 1, the network environment 100 may include client systems (or clients) 110 and 120 and a server system (or server) 140. The server system 140, in one example embodiment, may host an on-line trading platform 142. The client system 110 may run a browser application 112, while a client system 120 may be a mobile device and may run a mobile application 122. The client systems 110 and 120 may have access to the server system 140 via a communications network 130. The communications network 130 may be a public network (e.g., the Internet, a wireless network, etc.) or a private network (e.g., a local area network (LAN), a wide area network (WAN), Intranet, etc.).

The client system 110 may utilize the browser application 112 to obtain web pages (e.g., web pages related to the on-line trading platform 142) from the server system 140. The browser application 112 running on the client 110 may execute client-side code (e.g. Javascript) to start a timer at the moment it detects a web page response, use the timer to determine that the requested web page has not fully loaded after a predetermined period of time, and cause a lightweight version of the requested web page to be provided from the server 140. Such client-side code may be provided to the client 110 from the server 140. The server system 140 may host a system (a slow page load detector 144) configured to determine that a client requesting a web page should be served a lightweight version of the requested web page because the client may either have slow or insufficient processing resources (e.g., a slow Javascript interpreter) or a slow network connection with the server system 140. It will be noted that client side code (e.g. Javascript) for causing the associated browser to react to a slow page load may be used independent from the slow page load detector 144 provided at the server 140. An example server-side system for detecting slow page load may be described with reference to FIG. 2.

Figure 2:
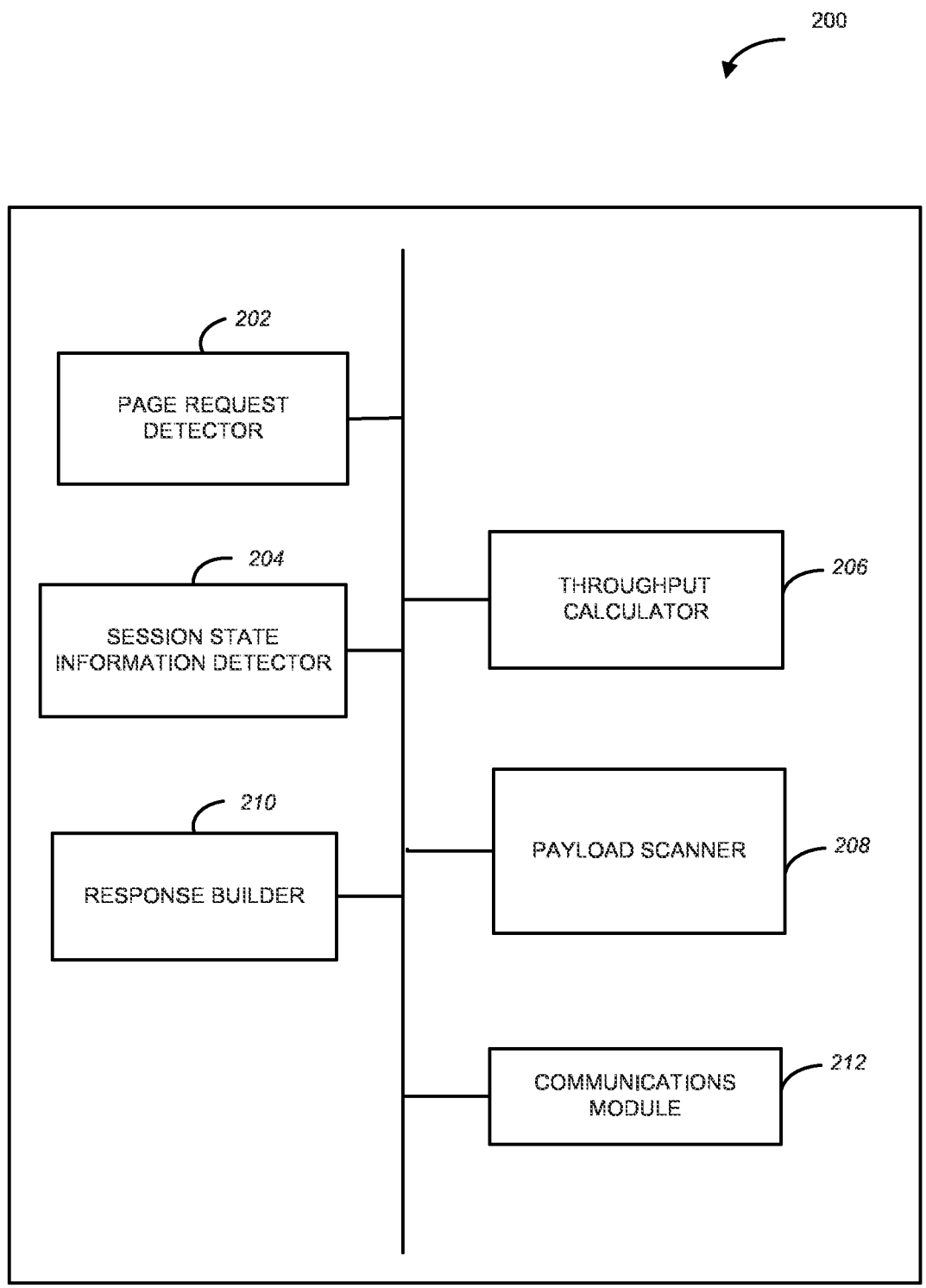
FIG. 2 is block diagram of a system for determining, at a server system, a throughput value associated with a client system and providing it to the client system, in accordance with one example embodiment.

FIG. 2 is block diagram of a system 200 for determining, at a server system, a throughput value associated with the client system and providing it to the client system, in accordance with one example embodiment. As shown in FIG. 2, the system 200 includes a page request detector 202, a session state information detector 204, a throughput calculator 206, a payload scanner 208, a response builder 210, and a communications module 212.

The page request detector 202 may be configured to receive, at a server system, a request for a web page from a client system. The session state information detector 204 may be configured to determine that the request for the web page does not include session state information. The session state information detector 204 may also be configured to trigger the monitoring of incoming ACK data packets from the client system for the duration of the current TCP connection. The monitoring may be performed by the throughput calculator 206. ACK (or an acknowledgement message) is a data packet message used in TCP communications to acknowledge receipt of a data packet. The throughput calculator 206 may be configured to calculate a throughput value associated with the network connection between the client system and the server system utilizing information (e.g., the RWIN value and the RTT value) obtained from the incoming ACK data packets. The payload scanner 208 may be configured to determine that a data packet to be sent in response to the request for the web page includes a placeholder for a throughput value in the data payload of the packet. In one embodiment, such a placeholder is included in the last data packet associated with the requested web page. For example, a data packet may be determined to be the last data packet if the payload of the data packet includes a Javascript call (e.g., expressed by the name of a Javascript function) and a set of placeholder bytes (e.g., '0e00'). The session state information detector 204, the throughput calculator 206, and the payload scanner 208 may be collectively referred to as a data packet pattern analyzer.

The response builder 210 may be configured to build an updated data packet by including, in the data packet that has a placeholder for a throughput value, the throughput value and an instruction (e.g., a Javascript call) to store the throughput value on the client as session state information (e.g., browser cookie). The communications module 202 may be configured to communicate the updated data packet to the client system. An example method performed by the system 200 may be described with reference to FIG. 3.

Figure 3:
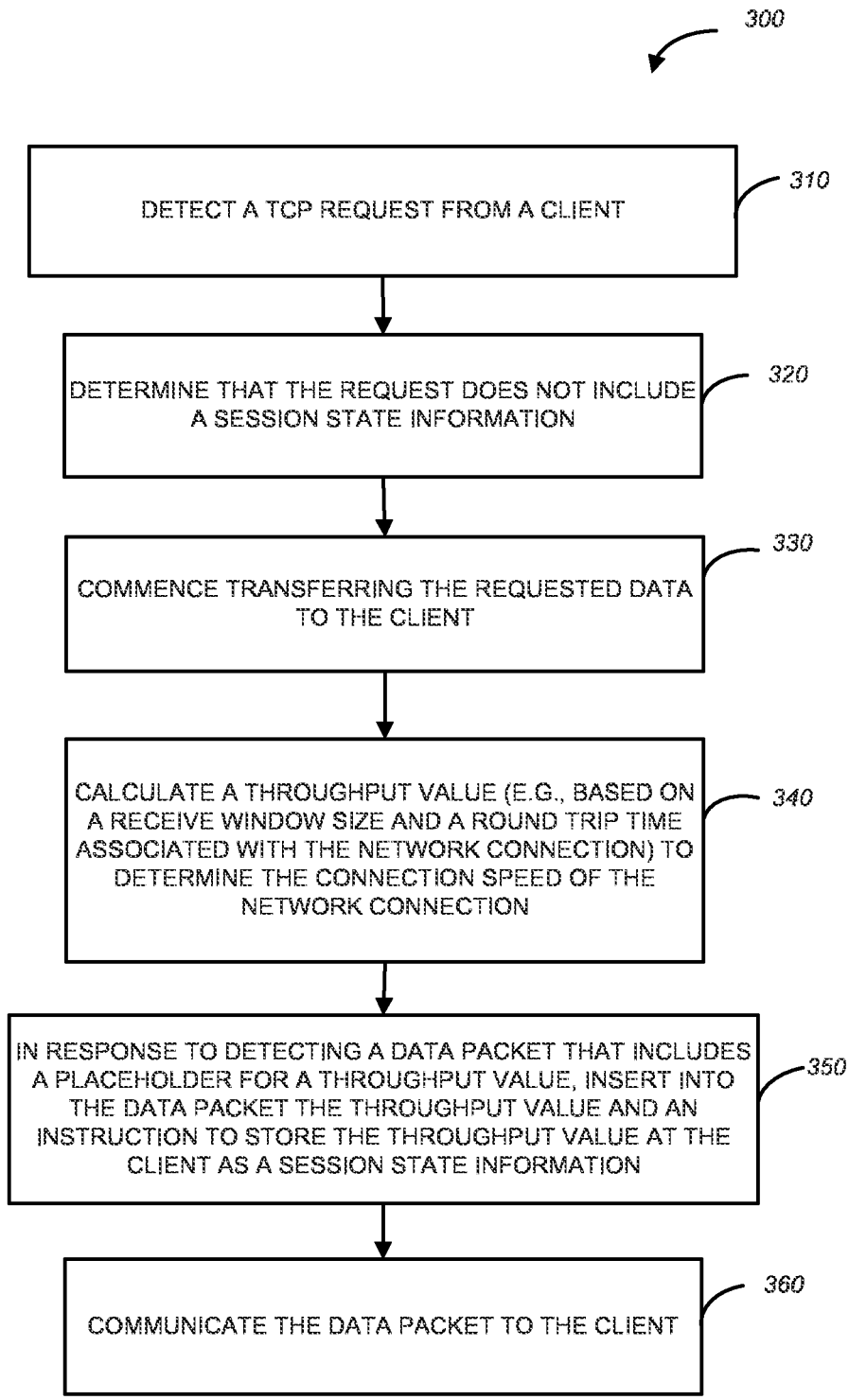
FIG. 3 is a flow chart of a method for determining, at a server system, a throughput value associated with the client system and providing it to the client system utilizing transport layer, in accordance with an example embodiment.

FIG. 3 is a flow chart of a method 300 for determining, at a server system, a throughput value associated with the client system and providing it to the client system utilizing transport layer, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the page request detector 202 of FIG. 2 receives, at the server system 140 of FIG. 1, a TCP request for from the client system 110 of FIG. 1. The TCP request may be a request for a web page or other information usable by, e.g., a web browser, a mobile application or a desktop widget. The session state information detector 204 of FIG. 2 determines that the request for the web page does not include session state information, at operation 320. In an example where the request is from a browser application installed on the client system 110, the session state information may be in the form of a browser cookie (termed a throughput cookie). The communications module 212 commences the sending of the requested data (e.g., the rich version of the requested web page) at operation 330. In the response, (e.g., in the HTTP response to the request for the web page,) a value may be set to indicate that the throughput calculator 206 of FIG. 2 (that may also be referred to as a transport layer bandwidth detector) is to be activated to measure connection speed associated with the network connection between a client and a server. At operation 340, the throughput calculator 206 of FIG. 2 calculates a throughput value associated with a network connection between the client system 110 and the server system 140 (e.g., based on the RWIN value and the RIT value determined from analyzing the TCP ACK packets received from the client). The payload scanner 208 of FIG. 2 identifies a data packet that includes a placeholder for a throughput value (that can be the last data packet to be sent to the client system 110 in response to a request for a web page). For example, the payload scanner 208 determines that a TCP data packet includes the pattern "writeCookielet ('ebay',tput','0e00') </script>" in the data payload and concludes that the throughput value can be inserted into this data packet. At operation 350, the response builder 210 of FIG. 2 builds an updated data packet by including, in the data packet, the throughput value and an instruction to store the throughput value on the client as session state information. For example, the placeholder bytes ('0e00') in the TCP data packet are replaced with the throughput value calculated by throughput calculator 206. The checksum for the modified data packet is recomputed and the communications module 202 of FIG. 2 communicates the updated data packet to the client system at operation 360.

Figure 4:
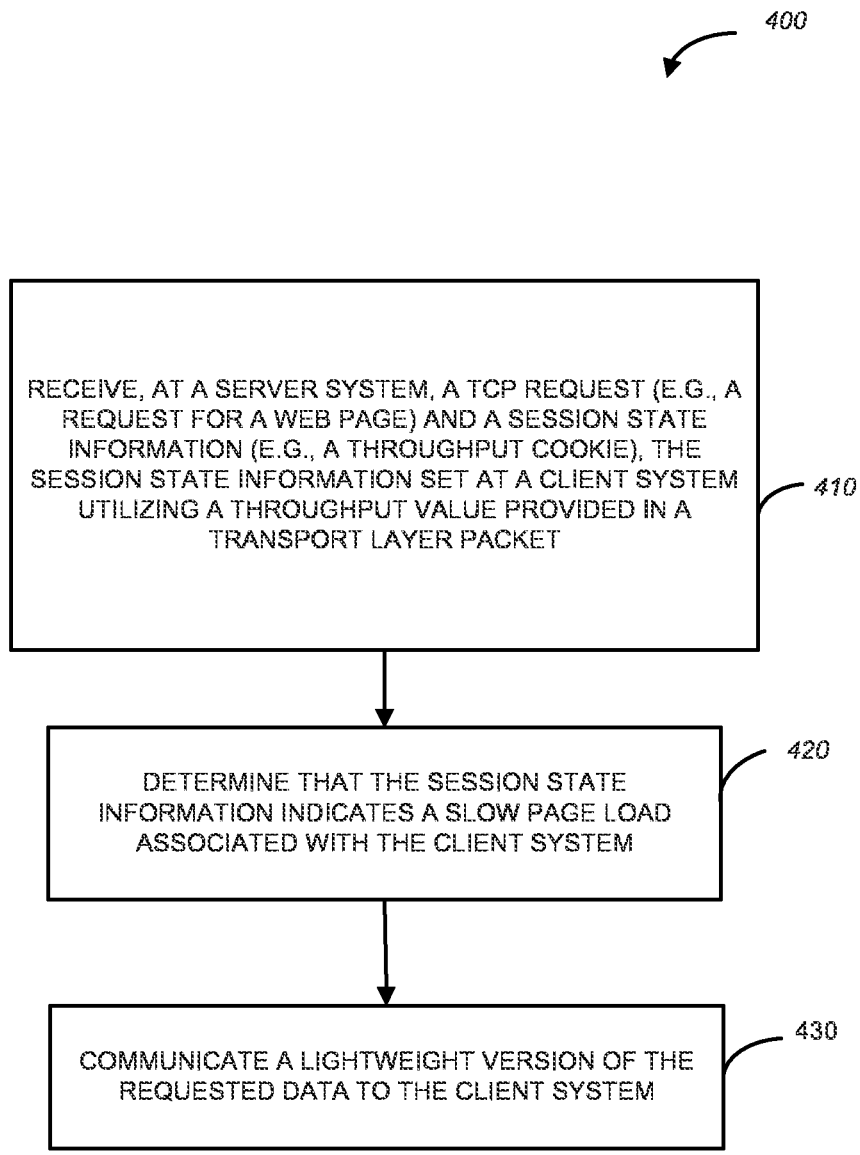
FIG. 4 is a flow chart of a method that utilizes session state information to determine that a client system is characterized by slow page load, in accordance with an example embodiment.

FIG. 4 is a flow chart of a method 400 that utilizes a browser cookie to determine that a client system is characterized by slow page load, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

At operation 410, the page request detector 202 of FIG. 2 receives, at the server system 140 of FIG. 1, a TCP request from the client system 110 of FIG. 1. The request includes session state information (e.g., in the form of a browser cookie) that was set at the client. At operation 420, it is determined that the session state information indicates a slow page load associated with the client system 110. In response, at operation 430, the communications module 212 of FIG. 2 sends a lightweight version of the requested data to the client system 110.

Figure 5:
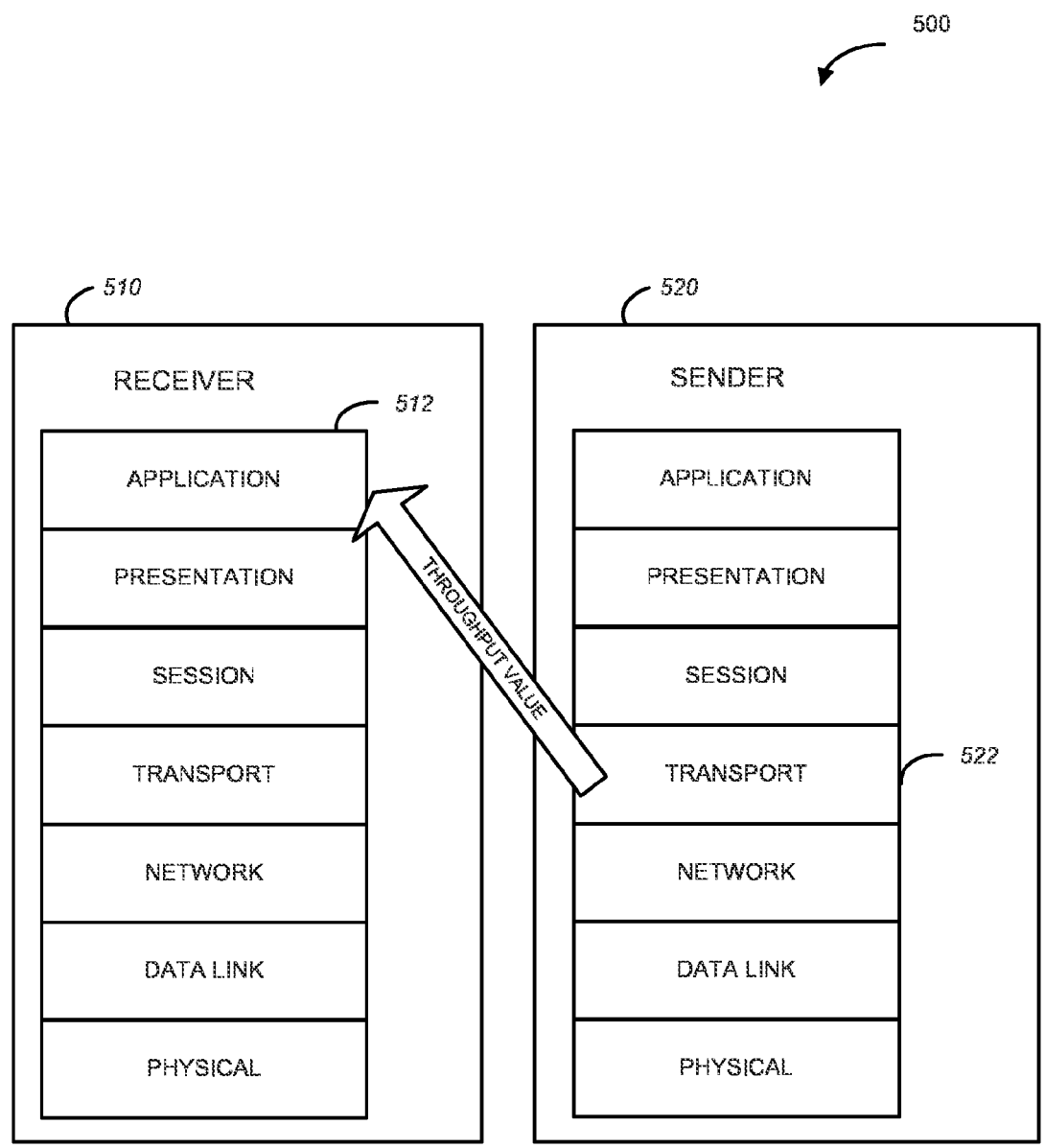
FIG. 5 is a block diagram of a system where information is communicated from the transport layer of one computer system to the application layer of another computer system, in accordance with an example embodiment.

Example approach where information is provided from the transport layer of one computer system to the application layer of another computer system is shown in FIG. 5. As shown in FIG. 5, a system 500 comprises a receiver computer system 510 and a sender computer system 520. According to one embodiment of the present invention, throughput data may be communicated from the transport layer 522 of the sender computer system 520 to the application layer 512 of the computer system 510. The connection throughput value calculated at the sender's transport layer 522 may be communicated to the receiver's application layer 512 by scanning at the sender's transport layer the payload of each outbound data packet on that connection, replacing any encountered placeholder bytes with the calculated throughput value, and recalculating the packet checksum.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 6:
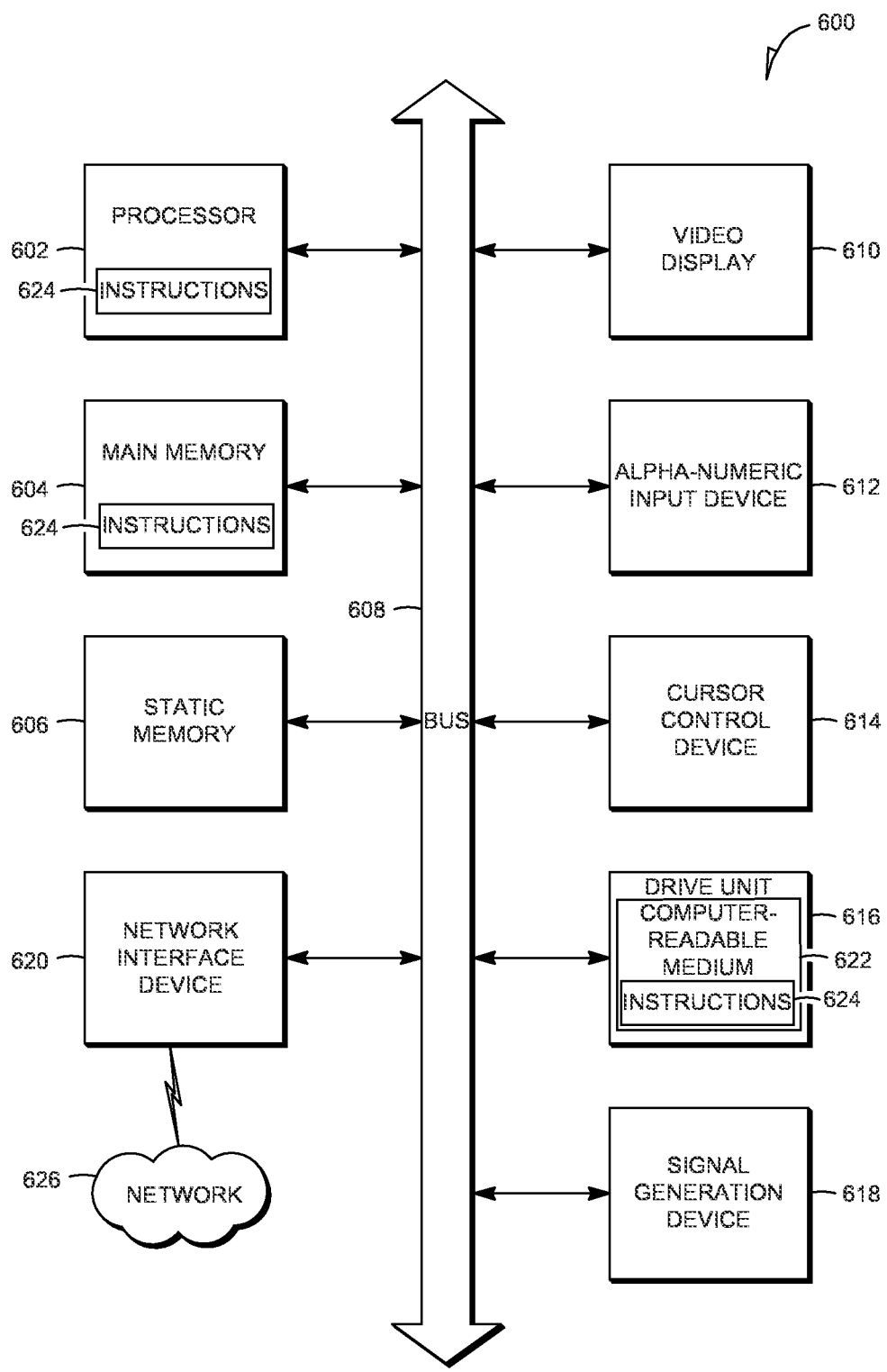
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for detecting slow page load have been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented system comprising:
   a page request detector, implemented using at least one processor, to receive, at a server system, a Transmission Control Protocol (TCP) request from a client system, the TCP request being a request for content;
   a communications module, implemented using at least one processor, to commence transmission of TCP data packets, responsive to the request, to the client system;
   a session state information detector, implemented using at least one processor, to trigger monitoring of incoming TCP acknowledgement message (ACK) data packets from the client system;
   a throughput calculator, implemented using at least one processor, to calculate a throughput value associated with a network connection between the client system and the server system based on the incoming TCP acknowledgement message (ACK) data packets;
   a packet generator, implemented using at least one processor, to generate a TCP data packet to be sent in response to the request for content, the generating of the TCP data packet comprising including into the TCP data packet a placeholder for a throughput value, a payload scanner, implemented using at least one processor, to determine, prior to transmission of the data packet, that payload of the TCP data packet includes the placeholder for a throughput value;

a response builder, implemented using at least one processor, to build an updated data packet by including, in the TCP data packet, the throughput value, the including comprising replacing bytes of the placeholder with the throughput value, the communications module to commence the updated data packet to the client system.

2. The system of claim 1, wherein the TCP data packet is the last TCP data packet associated with the requested content.

3. The system of claim 1, wherein the response builder is to include, in the TCP data packet, an instruction to store the throughput value on the client as session state information.

4. The system of claim 3, wherein the instruction to store the throughput value on the client as session state information is a Javascript call.

5. The method of claim 3, wherein the session state information is a browser cookie.

6. The system of claim 1, wherein the requested content is a web page.

7. The system of claim 1, wherein the session state information detector is to determine that the request for content does not include session state information.

8. The system of claim 1, wherein the throughput calculator is to calculate the throughput value utilizing a receive window size value and a round trip time associated with network connection connecting the server system and the client system.

9. The system of claim 1, wherein the payload scanner is to determine that the TCP data packet includes a placeholder for a throughput value by identifying a pattern in the TCP data packet.

10. The system of claim 1, wherein the response builder is to compute a checksum for the updated data packet prior to the communications module communicating the updated data packet to the client system.

11. A method comprising:
receiving, at a server system, a TCP request from a client system, the TCP request being a request for content;
commencing transmission of TCP data packets, responsive to the request, to the client system;
triggering monitoring of incoming TCP acknowledgement message (ACK) data packets from the client system;
calculating a throughput value associated with a network connection between the client system and the server system based on the incoming TCP acknowledgement message (ACK) data packets;
generating a TCP data packet to be sent in response to the request for content, the generating of the TCP data packet comprising including into the TCP data packet a placeholder for a throughput value;
prior to transmission of the data packet, determining that payload of the TCP data packet includes the placeholder for a throughput value;
building an updated data packet, utilizing at least one processor, by including, in the TCP data packet, the throughput value, the including comprising replacing bytes of the placeholder with the throughput value; and
communicating the updated data packet to the client system.

12. The method of claim 11, wherein the TCP data packet is the last TCP data packet associated with the requested content.

13. The method of claim 11, wherein the building of the updated data packet comprises including, in the TCP data packet, an instruction to store the throughput value on the client as session state information.

14. The method of claim 13, wherein the instruction to store the throughput value on the client as session state information is a Javascript call.

15. The method of claim 11, wherein the session state information is a browser cookie.

16. The method of claim 11, wherein the requested content is a web page.

17. The method of claim 11, comprising a session state information detector to determine that the request for content does not include session state information.

18. The method of claim 13, wherein the calculating of the throughput value comprises utilizing a receive window size value and a round trip time associated with the network connection.

19. The method of claim 11, comprising computing a checksum for the updated data packet prior to the communicating of the updated data packet to the client system.

20. A machine-readable non-transitory storage medium having instruction data to cause a machine to perform operations comprising:
receiving, at a server system, a TCP request from a client system, the TCP request being a request for content;
commencing transmission of TCP data packets, responsive to the request, to the client system;
triggering monitoring of incoming TCP acknowledgement message (ACK) data packets from the client system;
calculating a throughput value associated with a network connection between the client system and the server system based on the incoming TCP acknowledgement message (ACK) data packets;
generating a TCP data packet to be sent in response to the request for content, the generating of the TCP data packet comprising including into the TCP data packet a placeholder for a throughput value;
prior to transmission of the data packet, determining that payload of the TCP data packet includes the placeholder for a throughput value;
building an updated data packet by including, in the TCP data packet, the throughput value, the including comprising replacing bytes of the placeholder with the throughput value; and
communicating the updated data packet to the client system.

* * * * *